United States Patent

Finney et al.

(10) Patent No.: US 8,063,824 B2
(45) Date of Patent: Nov. 22, 2011

(54) MAGNITUDE-SQUARED COHERENCE FILTERING IN A TIME DIFFERENCE OF ARRIVAL (TDOA) OR GROUP DELAY INTERFEROMETRIC GEOLOCATION SYSTEM

(75) Inventors: Carl Finney, Ashburn, VA (US); Jeff White, Melbourne, FL (US); Alton Keel, Melbourne, FL (US)

(73) Assignee: Soneticom, Inc., Melbourne, FL (US)

( * ) Notice: Subject to any disclaimer, the term of this patent is extended or adjusted under 35 U.S.C. 154(b) by 147 days.

(21) Appl. No.: 12/548,408

(22) Filed: Aug. 26, 2009
(Under 37 CFR 1.47)

(65) Prior Publication Data
US 2010/0182200 A1    Jul. 22, 2010

Related U.S. Application Data

(60) Provisional application No. 61/092,042, filed on Aug. 26, 2008.

(51) Int. Cl.
*G01S 3/02* (2006.01)
(52) U.S. Cl. ..................................................... 342/424
(58) Field of Classification Search .................. 342/424
See application file for complete search history.

(56) References Cited

U.S. PATENT DOCUMENTS

| | | | |
|---|---|---|---|
| 4,355,368 A * | 10/1982 | Zeidler et al. ................. | 708/422 |
| 2002/0196186 A1* | 12/2002 | Holt .............................. | 342/453 |
| 2007/0111746 A1* | 5/2007 | Anderson ..................... | 455/522 |

* cited by examiner

*Primary Examiner* — Thomas Tarcza
*Assistant Examiner* — Frank McGue
(74) *Attorney, Agent, or Firm* — John L. DeAngelis; Beusse Wolter Sanks Mora & Maire, P.A.

(57) ABSTRACT

In a geolocation system for determining a geolocation of a target emitter, a method for determining the geolocation. The method comprising: (a) receiving a signal transmitted from the target emitter at each one of a plurality of sensors, a frequency spectrum associated with each signal; (b) determining a pairwise correlation between a first signal and a second signal from among the plurality of signals, the pairwise correlation determined at frequencies or within frequency bands within the frequency spectrum of at least one of the first and second signals; (c) identifying pairwise correlations below a predetermined threshold; (d) filtering the first and second signals by reducing a magnitude of energy at one or more frequencies or within one or more frequency bands to produce first and second filtered signals, the one or more frequencies or the one or more frequency bands selected responsive to pairwise correlations below the threshold; (e) determining a time difference estimate responsive to the first and second filtered signals; (f) repeating steps (b) through (e) for signals received at other of the plurality of sensors to determine additional pairwise time difference estimates; and (g) determining the geolocation of the target emitter from the piecewise time difference estimates.

9 Claims, 3 Drawing Sheets

MAGNITUDE-SQUARED COHERENCE FILTERING IN A TIME DIFFERENCE OF ARRIVAL (TDOA) OR GROUP DELAY INTERFEROMETRIC GEOLOCATION SYSTEM

CLAIM OF PRIORITY

This application claims priority under 35 U.S.C. section 119(e) to U.S. Provisional Patent Application assigned application No. 61/092,042. entitled Mean-Squared Coherence Filtering in a Time Difference of Arrival (TDOA) or Group Delay Interferometric Geolocation System and filed on Aug. 26, 2008, the entire contents of which are hereby incorporated by reference.

FIELD OF THE INVENTION

This invention relates to an apparatus and method for filtering target signals based on a determined magnitude-squared coherence of the target signals.

BACKGROUND OF THE INVENTION

In a time difference of arrival geolocation system the signal from a target emitter is received at three or more geographically distributed sensors. To determine a location of the emitter, it is necessary to calculate the difference in the arrival time of the same signal at each receiving sensor. These time differences (also referred to as the time difference of arrival or TDOA) correspond to differences in distance between the emitter and the receiving sensors since all signals travel at the speed of light. The distance between the target emitter and each sensor is given by d=ct, where c is the speed of light, t is the transmission time and d is the distance between the target emitter and the receiving sensor.

With the TDOA approach, a signal received at n receiving sites yields n(n−1)/2 pairs of time difference of arrival values from which the location of the emitter can be determined. Generally, the time difference of arrival of the same signal at any two receiving stations (referred to as a pairwise time difference of arrival) is a constant and yields a locus of points along a hyperbola. For example, possible locations of an emitter transmitting a signal arriving at a sensor S1 at t1 and arriving at a sensor S2 at t2 is defined by a locus of points comprising a hyperbolic curve, where the curve is defined by t2−t1=k1, where k1 is a constant.

With only two receiving stations using a TDOA method, it is generally not possible to determine a precise location for a target unit, but rather only a locus of points along a curve. Therefore, TDOA systems generally use at least three receiving stations to make a geolocation determination. For example, if the same signal is also received by a third sensor S3, two additional curves are computed based on the time difference of arrival of the signal at the three sensors taken in pairs. One such additional curve is determined by the time difference of arrival between sensors S1 and S3, and the other is determined by the time difference of arrival between sensors S2 and S3. The intersection of the three curves is the geolocation of the target emitter.

The target signal necessarily takes different paths to each sensor and may be corrupted by noise and interference as it propagates. Such noise and interference can reduce the accuracy of the target's determined location. The determination of the time difference of arrival of the signal at any two sensors is a problem in statistical estimation, with a time difference estimate (TDE) described by both a mean and a variance. The variance of the estimate determines the accuracy of the location solution and is affected by the signal bandwidth, signal-to-noise ratio and signal duration (the latter referred to as the coherent integration interval).

The present invention relates to determining a magnitude-squared coherence (MSC) of target signals and filtering the target signals based on the MSC to improve the accuracy of the TDE.

DETAILED DESCRIPTION OF INVENTION

Figure 1:
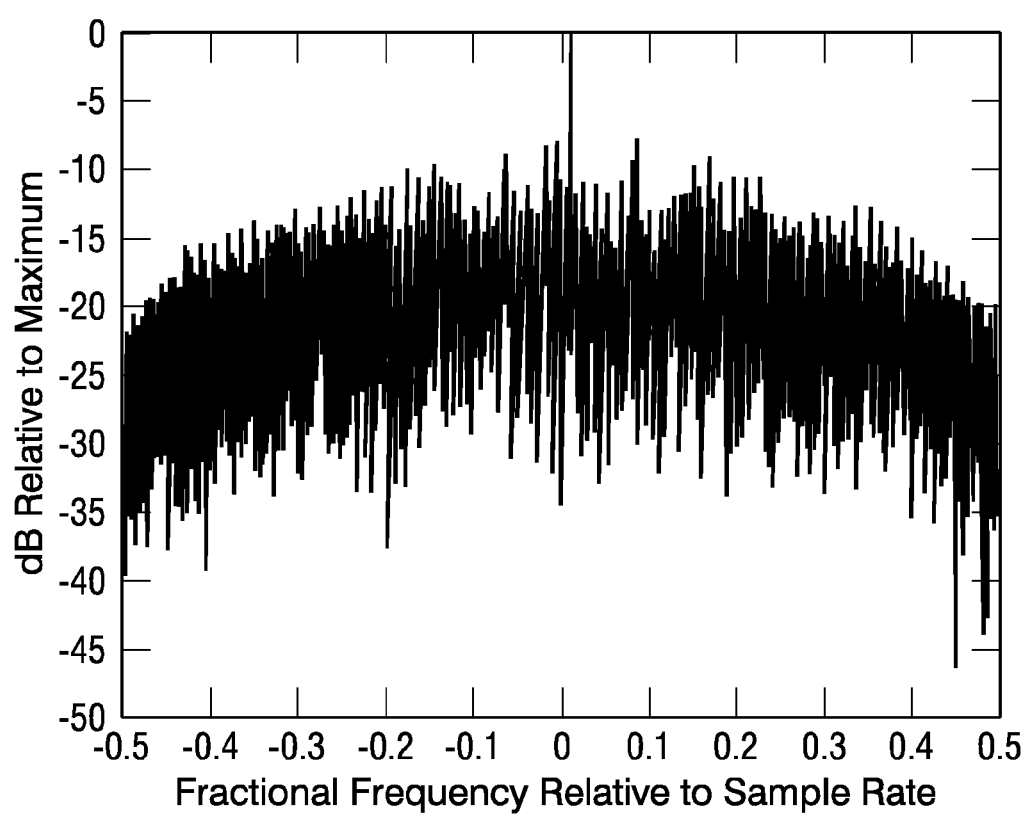
FIG. 1 is a frequency spectrum of a representative target signal having several nulls.

Before describing in detail the particular apparatuses and methods for determining the MSC and filtering the target signals according to the determined TDE in accordance with the various embodiments of the present invention, it should be observed that these embodiments describe a novel combination of hardware and method steps related to the claimed apparatuses and methods. Accordingly, the hardware and method steps have been represented by conventional elements in the drawings, showing only those specific details that are pertinent to the presented embodiments so as not to obscure the disclosure with details that will be readily apparent to those skilled in the art having the benefit of the description herein.

The following embodiments are not intended to define limits as to the elements or methods of the invention but only provide exemplary constructions. The embodiments are permissive rather than mandatory and illustrative rather than exhaustive.

Known statistical techniques provide an equation that defines how the TDE variance is affected by various signal parameters, including the signal bandwidth, the signal to noise ratio and the signal duration. The equation is referred to as the Cramer-Rao lower bound for the variance of the estimate. This equation states that the variance of the estimate is inversely proportional to the cube of the bandwidth, the square of the joint signal to noise ratio and to the coherent integration interval (i.e., the time span, stare time or duration of the observed signal). Obviously, the bandwidth of the received signal has the greatest impact on the variance of the time difference estimate and therefore on the accuracy of the geolocation solution.

Determination of the location of RF emitters by the TDOA technique or by a group delay interferometric technique requires an estimate of the difference in arrival time of a signal at two spaced-apart sensors. But many of the signals of interest (SOIs) have spectral frequency bands that have deep nulls (low power levels). These nulls are due to: 1) periodic components in the signaling structure or, 2) signal losses introduced by the propagation paths (channels) through which the signal travels to each one of the two sensors. FIG. 1 shows the frequency spectrum of an exemplary signal with several nulls.

It is instructive to examine the effect of spectral nulls on the performance of a geolocation system. First, the null represents a signal component with very little received power. Second, systems operating in non-HF portions of the radio spectrum (VHF, UHF, SATCOM, etc) are characterized by noise introduced by components in the receiver. This combination means that at a frequency where a signal null and interference are present, the signal-to-noise ratio is greatly reduced. If the magnitude of the energy at that frequency (or frequency band) can be reduced to zero, the noise added at the null is removed from the SNR calculation.

The lower SNR at signal null frequencies adds noise into the geolocation solution. Limiting or eliminating the noise at the null frequencies improves the SNR and thus the location accuracy. Since a geolocation system uses one received signal from each sensor as a correlation reference for one or more other signals, performance of the geolocation system can be improved by using only signal energy from the spectrum where the signals are statistically similar. The magnitude-squared coherence (MSC) between two signals provides a measure of this similarity. It has been determined that a large gain in SNR (and an attendant increase in location accuracy) results if the magnitude-squared coherence is low at the frequencies or frequency bands where the nulls occur.

Mathematically, the magnitude-squared coherence is defined as $$|P_{xy}(f)|^2/(P_{xx}(f)*P_{yy}(f))$$

where $|P_{xy}(f)|^2$ is the magnitude-squared coherence of the cross power spectral density of signals X and Y, f is frequency in Hz, and $P_{xx}(f)$ and $P_{yy}(f)$ are the power spectral densities of the signals X and Y.

Using the determined MSC, one can identify frequencies where the coherence is above a predetermined threshold (and thus the signals are considered statistically similar) and frequencies where the coherence is poor (and thus the signals are not considered statistically similar).

By eliminating the frequencies where the coherence is below a specified threshold, the signal-to-noise ratio of the signal as it is transferred into downstream components and algorithms is increased. Since geolocation accuracy and performance are proportional to the SNR, the overall system performance is improved when the SNR increases.

To accomplish this, frequency components of the two waveforms used in a time difference estimate (TDE) generating algorithm that are below a user-selected correlation-coefficient threshold are set to zero. This effectively sets the noise level (and the signal energy) at those frequencies to zero and thus the total signal-to-noise ratio in the two signals increases.

The solution taught by this invention comprises pattern matching the frequency spectra of two signals on a frequency-by-frequency basis (or a frequency band by frequency band basis) and reducing the magnitude of the energy of both signals (again on a frequency-by-frequency basis or a frequency band by frequency band basis) if a poor match (i.e., a low MSC) is determined. In one embodiment the magnitude is set to about zero. The comparison process can be carried out by analyzing integer frequencies or frequency bands. The magnitude-squared coherence algorithm performs the pattern match. In a preferred embodiment, the algorithm returns an estimate of the correlation coefficient (between 0 and 1.0) for each frequency or frequency band in a frequency spectrum. At frequencies where the correlation coefficient is less than about 0.7 (in one embodiment), the magnitude of the signal and noise energy is set to about zero.

This methodology results in a loss in the noise power equal to the fraction of the energy that was zeroed or removed. Since the signal power (or energy) at these frequencies was already greatly reduced by the null (up to many dB in some cases), the signal to noise ratio actually increases over the value that was seen before zeroing out the frequencies with low correlation.

Figure 2:
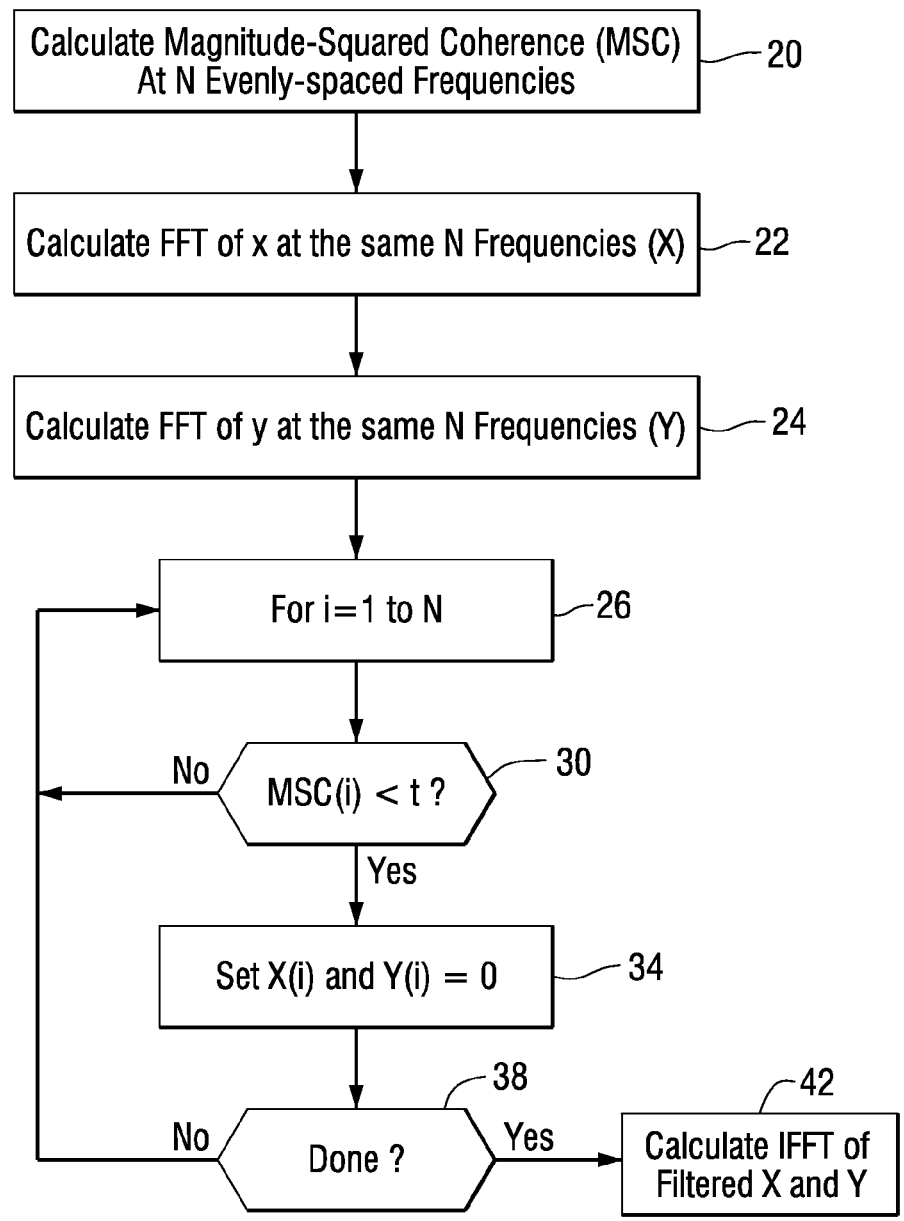
FIG. 2 is a flow diagram of signal processing steps according to the present invention.

The method is described in conjunction with the flowchart of FIG. 2. At a step 20, the MSC is calculated at N spaced-apart frequencies (e.g., evenly spaced frequencies) or frequency bands. Each frequency or frequency band is designated by an integer value of an index letter i. Thus MSC(1)=MSC(i=1) and identifies the MSC for the first frequency or the first frequency band. The fast Fourier transform is calculated for each of the N frequencies for the signals x(t) and y(t) at respective steps 22 and 24, yielding signals X(f) and Y(f) as a function of frequency. In another embodiment the N spaced-apart frequencies or frequency bands are selected based on null locations in one or both of the signals x(t) and y(t).

The index i is iterated at a step 26 followed by a decision step 30 where the MSC for each index value i is compared to a user-selected threshold t. The index i designates one of the frequencies or frequency bands in the signals X(f) and Y(f).

If the result of the decision step 30 is negative, processing returns to the iteration step 26, the i value is iterated and the MSC for the next succeeding i value is compared to the threshold.

If the result of the decision step 30 is affirmative, the energy of the signals X(f) and Y(f) for the current value of i is reduced (attenuated) at a step 34. In one embodiment, the attenuation reduces the energy to about zero.

A decision step 38 determines whether i=N, signifying that the iteration process has been completed. If the result at the decision step 38 is negative, processing returns to the step 26 and the index i is iterated.

If the result of the decision step 38 is affirmative, the process continues to a step 42 where the inverse FFT is determined for the filtered signals X and Y (i.e., with certain frequency components removed when the MSC is less than t as determined at the decision step 30).

Figure 3:
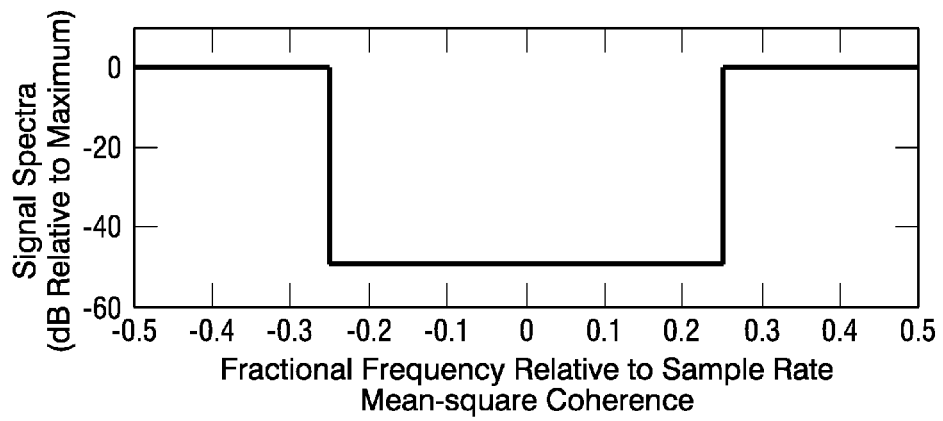
FIG. 3 is a graph of a frequency spectrum of idealized target signals.

A contrived example can further illustrate the process. FIG. 3 shows a noise-free spectra for two target signals that are used to generate a TDE. As can be seen, since the power level in a null is down 50 dB from a peak, the null is assumed to be at a zero power level in any power summation.

Figure 4:
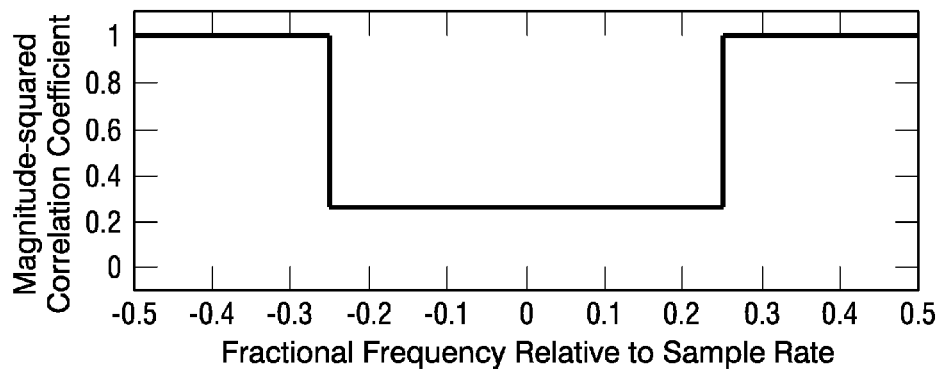
FIG. 4 is a graph of an MSC correlation coefficient of the target signals of FIG. 3.

FIG. 4 illustrates a magnitude-squared coherence (MSC) of the two signals. The MSC plot shows that half of the spectra (from a −0.25 fractional frequency to a +0.25 fractional frequency) has a correlation coefficient less than a 0.7 threshold. The energy at these frequencies can therefore be zeroed (or removed) according to the present invention. This results in a drop in the total noise power of 0.5 or −3 dB. Since the total signal power changed only infinitesimally by dropping the signal frequency components where a null is present, the signal-to-noise ratio of the signal output by the MSC filter increases by about 3 dB.

In the presented example, the determination of the MSC and use of an MSC coherence filter increases the SNR by 3 dB. Since half of the received signal has a correlation coefficient less than 0.7 (the fractional frequencies from −0.25 to +0.25) half of the noise is removed or zeroed out.

Of course in practice the SNR increase is less that the illustrated theoretical 3 dB. However, as is known by those skilled in the art, a large SNR swing is not required to significantly improve the location accuracy of a geolocation system.

Figure 5:
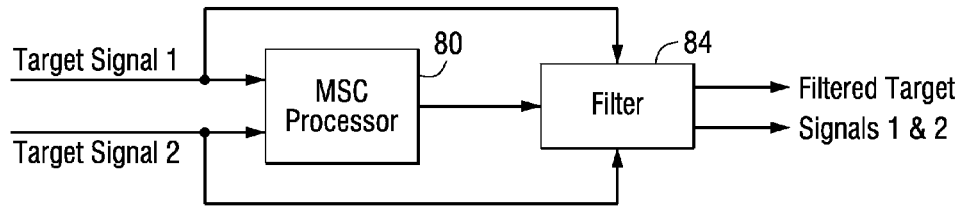
FIG. 5 is a block diagram of a system for improving the TDE based on the MSC according to the teachings of the present invention.

FIG. 5 illustrates a block diagram of a system according to the present invention. Target signals one and two are input to an MSC processor 80 for determining the MSC of the two input signals. The MSC processor 80 produces a control signal input to a filter 84 for controlling filter parameters to filter out or attenuate energy at frequencies or frequency bands having an MSC coefficient less than a predetermined threshold. Filtered target signals one and two are output from the filter 80 for further processing to determine the TDE and from that value to determine the location of the target emitter.

The present invention can be advantageously used with either a group-delay interferometric algorithm or a TDOA algorithm to calculate the TDE. The MSC filtering process described above can be integrated into either algorithm.

Thus the mean square coherence filtering algorithm of the present invention uses spectral matching of two waveforms and frequency domain filtering to improve the TDE at which a signal was received at two sensors.

The teachings of the present invention can be used to improve performance of any geolocation systems (including, for example, direction finding systems, time difference of arrival systems, angle of arrival systems, frequency difference of arrival systems, hybrid techniques that utilize one or more of the listed techniques, and super-resolution systems). The teachings can also be employed with receivers having digitizers and block gain stages with digitizers.

Use of the present invention can improve performance of passive radar systems and GPS devices (global positioning system devices) where the signals propagate in a frequency selective multipath environment.

Any one or more of the above method steps may also be incorporated into a computer-based system including a processor and a memory comprising computer-readable instructions that, when executed by the processor, cause a computer to perform any one or more of the method steps set forth herein.

When used herein the reference to a zero energy magnitude comprises less than about 1 dB down.

While the invention has been described with reference to various embodiments, it will be understood by those skilled in the art that various changes may be made and equivalent elements and process steps may be substituted for elements thereof without departing from the scope of the present invention. The scope of the present invention further includes any combination of the elements and process steps from the various embodiments set forth herein. In addition, modifications may be made to adapt a particular situation to the teachings of the present invention without departing from its essential scope. Therefore, it is intended that the invention not be limited to the particular embodiments disclosed for carrying out this invention, but that the invention will include all embodiments falling within the scope of the appended claims.

What is claimed is:

1. In a geolocation system for determining a geolocation of a target emitter, a method for determining the geolocation comprising:
   (a) receiving a signal transmitted from the target emitter at each one of a plurality of sensors, a frequency spectrum associated with each signal;
   (b) determining a pairwise correlation between a first signal and a second signal from among the plurality of signals, the pairwise correlation determined at frequencies or within frequency bands within the frequency spectrum of at least one of the first and second signals;
   (c) identifying pairwise correlations below a predetermined threshold;
   (d) filtering the first and second signals by reducing a magnitude of energy at one or more frequencies or within one or more frequency bands to produce first and second filtered signals, the one or more frequencies or the one or more frequency bands selected responsive to pairwise correlations below the threshold;
   (e) determining a time difference estimate responsive to the first and second filtered signals;
   (f) repeating steps (b) through (e) for signals received at other of the plurality of sensors to determine additional pairwise time difference estimates; and
   (g) determining the geolocation of the target emitter from the piecewise time difference estimates.

2. The geolocation system of claim 1 wherein a step (b) is executed only at frequencies or within frequency bands presenting a null in the frequency spectrum of at least one of the first and second signals.

3. The geolocation system of claim 1 wherein the predetermined threshold comprises a value of about 0.7.

4. The geolocation system of claim 1 wherein a step (a) further comprises digitizing each received signal.

5. The method of claim 1 wherein the geolocation system comprises a direction-finding system, a time difference of arrival system, an angle of arrival system or a frequency difference of arrival system.

6. The method of claim 1 wherein a step (b) further comprises determining a pairwise correlation between the first and second signals from among the plurality of signals, the pairwise correlation determined at a predetermined number of evenly spaced-apart frequencies within the frequency spectrum of at least one of the first and second signals.

7. The method of claim 1 wherein the pairwise correlation comprises a magnitude-squared coherence.

8. The method of claim 7 wherein the magnitude-squared coherence is determined from $|Pxy(f)|2/(Pxx(f)*Pyy(f))$, where $|Pxy(f)|2$ is a magnitude-squared coherence of the cross power spectral density of signals X and Y, f is frequency in Hz, and $Pxx(f)$ and $Pyy(f)$ are power spectral densities of the signals X and Y.

9. The method of claim 7 wherein a step (b) further comprises determining a Fourier transform of the first and second signals then determining the pairwise correlation between the first and second signals at frequencies or within frequency bands within the frequency spectrum of at least one of the first and second signals.

\* \* \* \* \*